US010793023B2

United States Patent
Imamura

(10) Patent No.: US 10,793,023 B2
(45) Date of Patent: Oct. 6, 2020

(54) MOTOR MOUNTING STRUCTURE FOR ELECTRIC SEAT SLIDING DEVICE

(71) Applicant: TF-METAL Co., Ltd., Kosai-shi, Shizuoka (JP)

(72) Inventor: Takashi Imamura, Kosai (JP)

(73) Assignee: TF-METAL CO., LTD., Kosai-shi (JP)

( * ) Notice: Subject to any disclaimer, the term of this patent is extended or adjusted under 35 U.S.C. 154(b) by 0 days.

(21) Appl. No.: 16/244,269

(22) Filed: Jan. 10, 2019

(65) Prior Publication Data

US 2019/0291602 A1    Sep. 26, 2019

(30) Foreign Application Priority Data

Mar. 20, 2018   (JP) ................................ 2018-051860

(51) Int. Cl.
*B60N 2/02* (2006.01)

(52) U.S. Cl.
CPC ...... *B60N 2/0232* (2013.01); *B60N 2002/024* (2013.01); *B60N 2002/0236* (2013.01)

(58) Field of Classification Search
CPC .............. B60N 2/0232; B60N 2/067; B60N 2002/0236; B60N 2002/024; B60N 2002/0288
USPC ..... 248/424, 429; 297/144, 284.3, 311, 330, 297/344.1, 362
See application file for complete search history.

(56) References Cited

U.S. PATENT DOCUMENTS

| | | | | |
|---|---|---|---|---|
| 2001/0048058 | A1* | 12/2001 | Folliot | B60N 2/0232 248/429 |
| 2008/0309137 | A1* | 12/2008 | Kostin | B60N 2/0232 297/344.1 |
| 2009/0272869 | A1* | 11/2009 | Beneker | B60N 2/067 248/429 |
| 2013/0015313 | A1* | 1/2013 | Schmid | B60N 2/067 248/429 |
| 2016/0082863 | A1* | 3/2016 | Kostin | B60N 2/067 248/429 |
| 2019/0291602 | A1* | 9/2019 | Imamura | B60N 2/0232 |

FOREIGN PATENT DOCUMENTS

JP    2001-334858 A    12/2001

* cited by examiner

*Primary Examiner* — Muhammad Ijaz
(74) *Attorney, Agent, or Firm* — Foley & Lardner LLP

(57) ABSTRACT

A motor mounting structure for an electric seat sliding device includes: a motor; first and second elastic support members arranged to be mounted on the first and second protruding portions of the motor; a bracket arranged to support the both ends of the motor through the first and second elastic support members; and the second elastic support member being arranged to be moved between a position at which the second elastic support member is engaged with the second guide portion, and a position where the second elastic support member is disengaged from the second guide portion, and where the second elastic support portion is mounted on the second protruding portion of the motor positioned at the initial assembly position.

7 Claims, 3 Drawing Sheets

MOTOR MOUNTING STRUCTURE FOR ELECTRIC SEAT SLIDING DEVICE

BACKGROUND OF THE INVENTION

The present invention relates to a motor mounting structure for an electric seat sliding device mounted on a vehicle.

A Japanese Patent Application Publication No. 2001-334858 (corresponding to U.S. Patent Application Publication No. 2001/0048058 A1) discloses a motor mounting structure for an electric seat sliding device. This motor mounting structure includes a pair of left and right upper rails which extends on left and right sides of a seat in a seat sliding direction; and a motor support bracket which is disposed at a substantially central position in a longitudinal direction of the upper rails, to connect and extend between these upper rails. This motor support bracket includes a pair of support portions elected in a vertical direction. Both end portions of the motor in an axial direction are supported by these support portions through elastic bushes.

Besides, a rotation output of the motor is transmitted to a gear box constituted, for example, by a worm and a worm wheel which are assembled in the left and right upper rails. In the worm wheel engaged with the worm within the gear box, an internal screw portion on an inner circumference is screwed with a screw shaft of a lower rail. The upper rails are slid and moved by helical function according to the worm wheel.

SUMMARY OF THE INVENTION

However, in the above-described motor mounting structure, it is necessary to assemble the motor to the motor support bracket while elastically varying shapes of the elastic bushes, so as to prevent the generation of the backlash and the vibration. Accordingly, the workability of the assembly operation of the motor is deteriorated. Moreover, this motor assembling structure is unsuitable for the automation. Furthermore, in this motor mounting structure, in a case where the motor support bracket is made of one metal sheet, the sheet is bent in a three-dimensional manner. Consequently, the man-hour for the press-processing of the bending process and the perforating process is increased to increase the cost.

It is, therefore, an object of the present invention to provide a motor mounting structure for an electric seat sliding device which is devised to solve the above-mentioned problems, to simplify a shape of a motor support bracket to decrease a cost, and to readily attain automation of the motor assembly operation.

According to one aspect of the present invention, a motor mounting structure for an electric seat sliding device, the motor mounting structure comprises: a motor including first and second protruding portions which are provided on both ends of the motor in an axial direction; a first elastic support member arranged to be mounted on the first protruding portion of the motor; a second elastic support member arranged to be mounted on the second protruding portion of the motor; and a bracket arranged to support the both ends of the motor through the first elastic support member and the second elastic support member, the bracket including; an opening portion which has a length longer than an axial length of the motor, and which is arranged to receive the motor, first and second guide portions which are formed, respectively, on both end portions of the opening portion in a longitudinal direction, and which is arranged to be engaged, respectively, with the first and second elastic support members, the motor being arranged not to be unmounted from the bracket in a direction perpendicular to the axial direction of the motor, at a position at which the first and second elastic support members mounted on the first and second protruding portions of the motor are engaged with the first and second guide portions, at which and the motor is positioned at a normal assembly position with respect to the bracket, the first elastic support member being arranged to be moved between a position at which the first elastic support member is mounted on the first protruding portion, and an escape position at which the first elastic support member is unmounted from the first protruding portion, in a state where the first elastic support member is mounted on the first guide portion, the opening portion the first and second guide portions which have a shape arranged to receive the motor to which the second elastic support member is mounted on the second protruding portion, at an initial assembly position at which the motor is positioned coaxially with the first elastic support member positioned at the escape position, and the second elastic support member being arranged to be moved between a position at which the second elastic support member is engaged with the second guide portion, and a position where the second elastic support member is disengaged from the second guide portion, and where the second elastic support portion is mounted on the second protruding portion of the motor positioned at the initial assembly position.

DETAILED DESCRIPTION OF THE INVENTION

Figure 1:
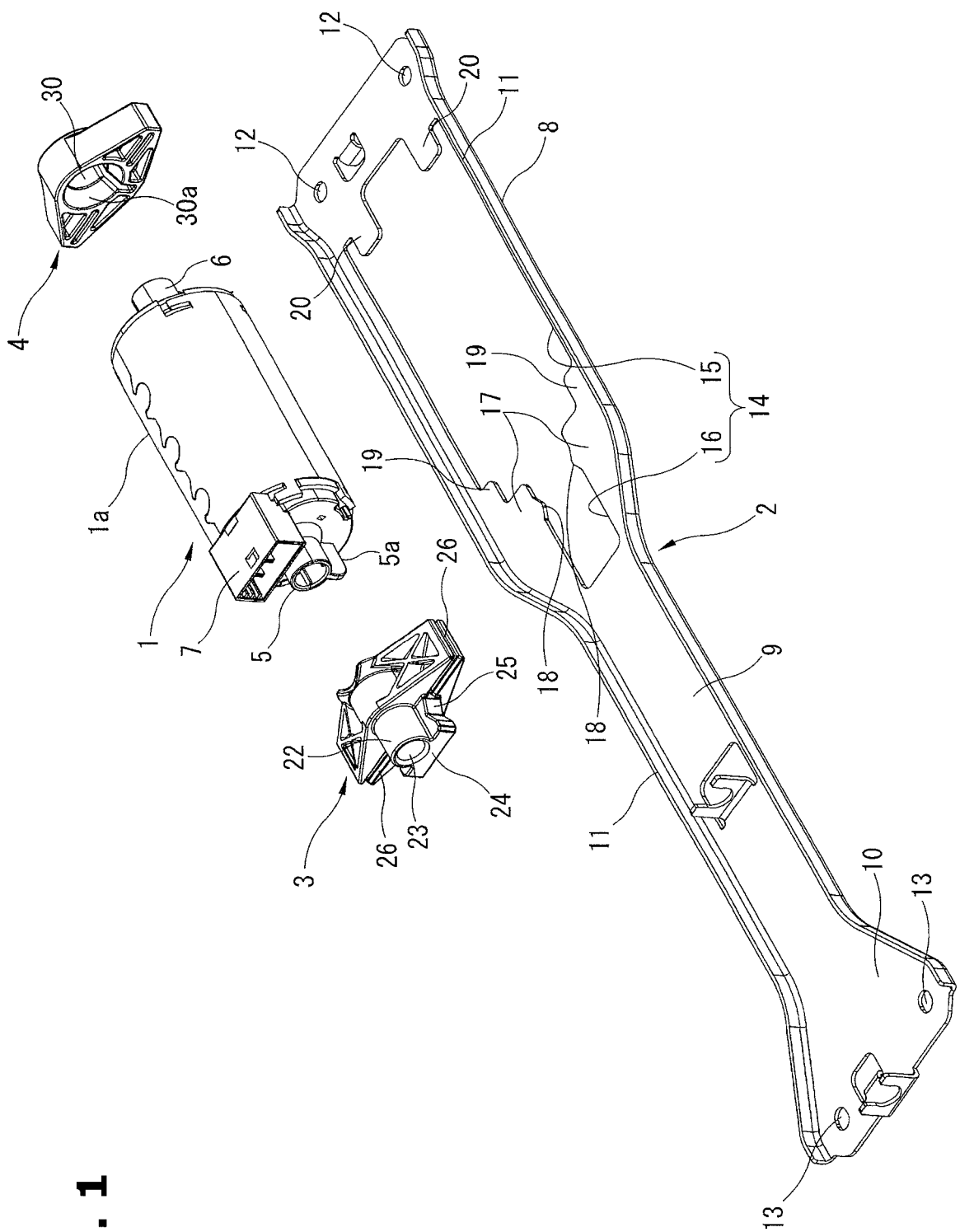
FIG. 1 is an exploded perspective view showing a motor mounting structure for an electric seat sliding device according to an embodiment of the present invention, and showing a relative position relationship among a motor, a bracket, and first and second dampers.
Figure 2:
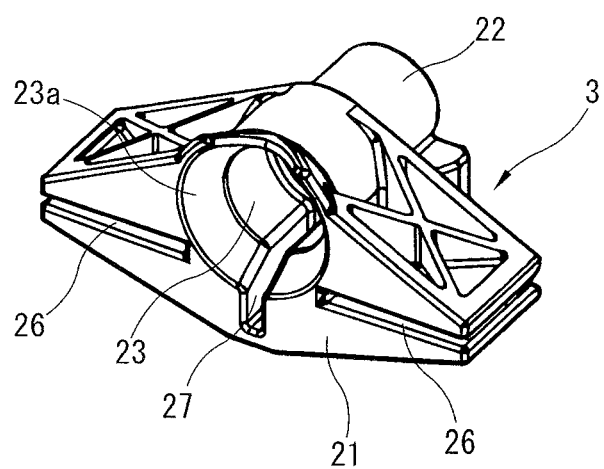
FIG. 2 is a perspective view showing the first damper of FIG. 1 when viewed from a direction opposite to a view direction in FIG. 1.
Figure 3:
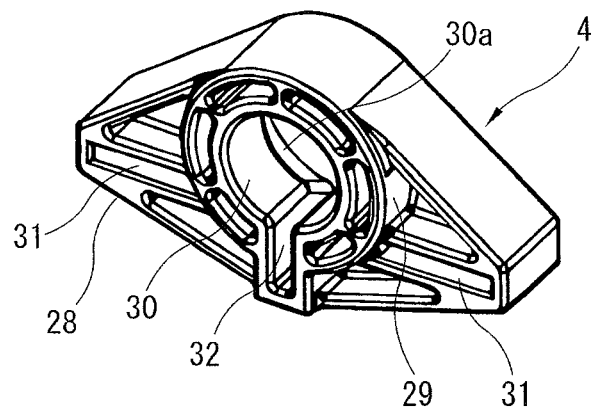
FIG. 3 is a perspective view showing the second damper of FIG. 1 when viewed from the direction opposite to the view direction of FIG. 1.

FIGS. 1 to 4 show a motor mounting structure of an electric seat sliding device according to an embodiment of the present invention. FIG. 1 is an exploded perspective view showing a position relationship among a motor, a bracket, and first and second dampers. FIGS. 2 and 3 are perspective views showing the first and second dampers shown in FIG. 1 when viewed from a direction opposite to the view direction of FIG. 1. Moreover, FIGS. 4A to 4C are plan views showing an assembly process in the structure shown in FIG. 1.

The motor mounting structure shown in FIG. 1 includes a motor 1 which is an electric driving source of the electric seat sliding device; and a bracket 2 supporting this motor 1; and a first damper 3 and a second damper 4 which are first and second elastic support members, and which are disposed between the bracket 2 and the motor 1 when the bracket 2 supports the motor 1.

The motor 1 has a cylindrical shape. The motor 1 includes a cylindrical motor case 1a; and first and second protruding portions 5 and 6 which have cylindrical shapes, and which are formed on both end surfaces of the motor case 1a on an axis of the motor 1. The first protruding portion 5 includes a key plate 5a which is formed on an outer circumference of the first protruding portion 5 to protrude from the outer circumference in a radial direction of the motor 1, and which serves as a key arranged to prevent a rotation. Similarly, the second protruding portion 6 includes a key plate (which is hidden behind the motor case 1a in FIG. 1) which is formed on an outer circumference of the second protruding portion 6 to protrude from the outer circumference in the radial direction of the motor 1, and which serves as a key arranged to prevent the rotation. Moreover, a power feed connector 7 is provided to a part of the motor case 1a.

The bracket 2 has an elongated shape having a long side extremely longer than a short side. The bracket 2 includes a motor mounting portion 8 which has a large width; and an extension portion 9 which has a width smaller than the width of the motor mounting portion 8, and which is integrally connected in series with the motor mounting portion 8. Moreover, the bracket 2 includes a large width end portion 10 which is formed at one end portion (a left side in FIG. 1) of the extension portion 9 by increasing the width, and which is integrally connected in series with the extension portion 9. Furthermore, the bracket 2 includes flange portions 11 which have small heights, which are formed on the two long sides of the bracket 2 including the motor mounting portion 8, the extension portion 9, and the large width end portion 10 to be erected from the bracket 2. However, the entire of the bracket 2 has a flat shape.

Moreover, the bracket 2 includes a pair of mounting holes 12 formed in the motor mounting portion 8, and a pair of mounting holes 13 formed in the large width end portion 10. The bracket 2 is tightened and fixed to left and right sliding rails (not shown) by bolts (not shown) inserted into these mounting holes 12 and 13, so as to extend and connect between these sliding rails.

The motor mounting portion 8 of the bracket 2 includes an opening portion 14 which is a hollow shape and a stepped shape, and which receives the motor 1. This opening portion 14 has a shape substantially similar to a projection shape of the motor 1 including the first and second protruding portions 5 and 6 on the both ends of the motor 1. The opening portion 14 has a length and a width which are greater than those of the projection shape of the motor 1. In particular, the opening portion 14 includes a large width portion 15 having a substantially rectangular shape; and a small width portion 16 which has a width smaller than the width of the large width portion 15, and which is continuous in series with the large width portion 15.

Moreover, the bracket 2 includes a pair of left and right first guide protruding portions 17 which are first guide portions, which are flat plate portions outside long sides of the small width portion 16 of the opening portion 14, which are portions inside edges of the motor mounting portion 8 that are inwardly curved toward the extension portion 9 having the small width, and which protrude or extend in the flat plate shape to the opening portion 14.

Each of the first guide protruding portions 17 includes a positioning protrusion portion (raised portion) 18 which is formed on an edge of the each first guide protruding portion 17 that confronts the small width portions 16, which constitute a holding section with positioning recessed portions 25 (cf. FIG. 2) described later, and which confront each other in a widthwise direction of the bracket 2. By the pair of the positioning protrusion portions 18 confronting each other, the opening region of the small width portion 16 is locally decreased.

Moreover, as shown in FIG. 1, the bracket 2 includes auxiliary guide protruding portions 19 each formed in the opening portion 14 at an inner corner portion between the long side portion 15 and the first guide protruding portion 17. With this, the further one stepped portion is provided to the opening portion 14.

On the other hand, the large width portion 15 includes a pair of left and right second guide protruding portions 20 which are second guide portions, which are formed on the short side portion of the large width portion 15 that is opposite to the small width portion 16, and which protrude and extend toward the small width portion 16. The first protruding portions 17 being the first guide portions and the second protruding portions 20 being the second guide portions are positioned on the same plane.

The first and second dampers 3 and 4 shown in FIG. 1 are first and second elastic support members. The first and second dampers 3 and 4 are made from rubber series elastic material. Each of the first and second dampers 3 and 4 is formed into a substantially flat diamond (lozenge) shape when viewed in an axial direction of the motor 1. The first and second dampers 3 and 4 are mounted, respectively, on the first and second protruding portions 5 and 6 located on the both end surfaces of the motor 1 shown in FIG. 1.

As shown in FIG. 1 and FIG. 2 which is a perspective view when viewed from a direction opposite to the view direction in FIG. 1, the first damper 3 includes a main body portion 21 having a substantially flat diamond (lozenge) shape; a guide sleeve 22 which has a cylindrical hollow shape, which is integrally formed at a substantially central portion of the main body portion 21 to protrude from the main body portion 21; and an insertion hole 23 formed in the guide sleeve 22 to penetrate through the guide sleeve 22 in the axial direction of the guide sleeve 22. Moreover, the first damper 3 includes a base portion 24 which has a substantially rectangular block shape, and which is integrally formed on a lower side of the guide sleeve 22, as shown in FIG. 1. The base portion 24 includes the positioning recessed portions 25 which are formed on both sides of the base portion 24 in a direction perpendicular to the axial direction of the guide sleeve 22, and which are arranged to be engaged (a raised and recessed engagement) with the positioning protrusion portions 18 formed on the end edges of the small width portion 16 of the opening portion 14. These positioning protrusion portions 18 and the positioning recessed portions 25 are the holding section arranged to restrict the position of the first damper 3 with respect to the bracket 2, as described below.

The main body portion 21 includes slit portions 26 which are formed on both sides of the guide sleeve 22 in an entire axial length of the main body portion 21 in the axial direction of the guide sleeve 22. The slit portions 26 are opened on the both end surfaces of the main body portions 21 in the axial direction of the guide sleeve 22. Moreover, the slit portions 26 are opened on end surfaces of the main body portion 21 in the direction perpendicular to the axial direction of the guide sleeve 22.

Moreover, the insertion hole 23 of the guide sleeve 22 includes a tapered portion 23a which is formed at a portion confronting the first protruding portion 5 of the motor 1, and which has diameters that are gradually decreased toward a back side of FIG. 2. Furthermore, the insertion hole 23 includes a key groove 27 which is formed on an inner circumference surface of the guide sleeve 22 including the tapered portion 23a, and which is arranged to receive the key plate 5a of the first protruding portion 5. Besides, the first damper 3 is mounted on the first protruding portion 5 of the motor 1 shown in FIG. 1, as described later. However, the first damper 3 has a shape to avoid an interference with the connector 7 at the mounting to the first damper 3.

The second damper 4 has a configuration substantially identical to the configuration of the first damper 3. That is, as shown in FIG. 1 and FIG. 3 which is the perspective view when viewed from a direction opposite to the view direction in FIG. 1, the second damper 4 includes a main body portion 28 having a substantially flat diamond (lozenge) shape; a guide sleeve 29 which has a cylindrical hollow shape, which is integrally formed at a substantially central portion of the main body portion 28; and an insertion hole 30 formed in the guide sleeve 29 to penetrate through the guide sleeve 29 in an axial direction of the main body portion 28. Moreover, the main body portion 28 includes slit portions 31 formed on both sides of the guide sleeve 29 in entire axial lengths of the main body portion 28 in the axial direction of the guide sleeve 29. However, these slit portions 31 are opened only on both end surfaces of the main body portion 28 in the axial direction of the guide sleeve 29. These slit portions 31 are not opened on end surfaces of the main body portion 28 in a direction perpendicular to the axial direction of the guide sleeve 29, unlike the first damper 3.

Furthermore, the insertion hole 30 of the guide sleeve 29 includes a tapered portion 30a which is formed at a portion confronting the second protruding portion 6 of the motor 1, and which has diameters decreased toward a back side of FIG. 1. The second damper 6 includes a key groove 32 which is formed on an inner circumference of the guide sleeve 29 including the tapered portion 30a, and which is arranged to receive the key plate of the second protruding portion 6 that has a shape identical to that of the key plate 5a of FIG. 1.

In a motor mounting structure of the thus-constructed electric seat sliding device, an assembling process of the motor 1 is explained with reference to FIG. 1 and FIGS. 4A to 4C which are illustrative plan views.

Figure 4A:
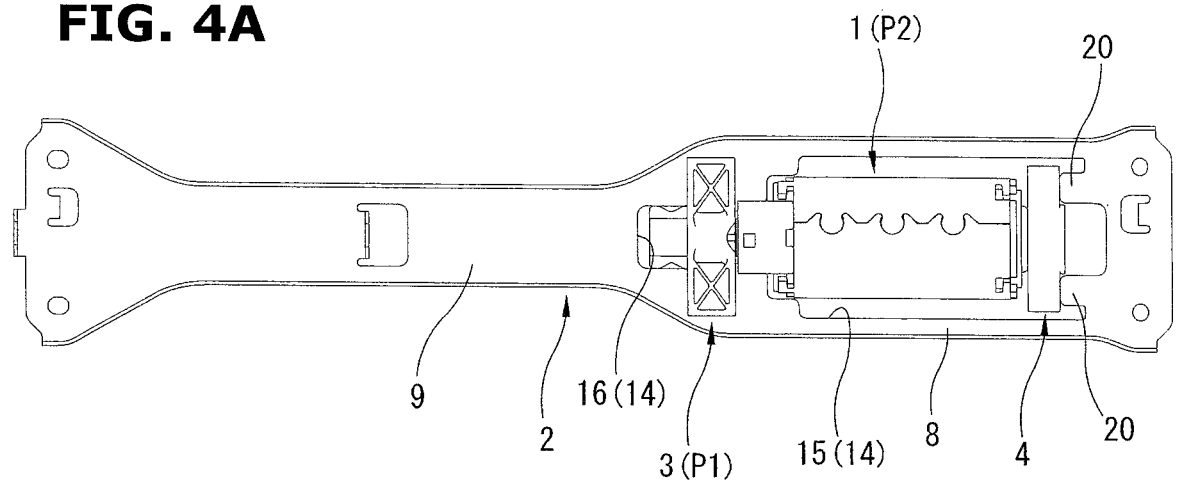
FIGS. 4A to 4C are illustration plan views showing an assembly process of the motor and the first and second dampers shown in FIG. 1 with respect to the bracket.

Firstly, the only first damper 3 is mounted to the bracket 2. That is, as shown in FIG. 1, the first damper 3 is pressed against the end portion of the small width portion 16 from the large width portion 15 of the opening portion 14. Then, the pair of the first guide protruding portions 17 are inserted into the pair of the slit portions 26 of the first damper 3. Finally, the first damper 3 is inserted to be abutted on the inner portion (the bottom portion) of the small width portion 16. FIG. 4A shows this state where the first damper 3 is inserted to be abutted on the inner portion (the bottom portion) of the small width portion 16. This position of the first damper 3 at which the first damper 3 is inserted to be abutted on the inner portion of the small width portion 16 is referred to as an escape (evacuation) position P1.

Next, in a state where the first damper 3 is mounted in the bracket 2 at the escape position P1, the second damper 4 is mounted to the motor 1 so that the insertion hole 30 of the second damper 4 is inserted onto the second protruding portion 6 of the motor 1. Then, the motor 1 and the second damper 4 are received within the opening portion 14 of the bracket 2, as shown in FIG. 4A.

In this case, the motor 1 and the second damper 4 are disposed in the opening portion 14 on a side of the small width portion 16 so that the second damper 4 mounted to the motor 1 is not interfered with the second guide protruding portions 20 of the bracket 2, as shown in FIG. 4A. With this, the first protruding portion 5 of the motor 1 is positioned in the opening region of the small width portion 16 in the opening portion 14, so that the motor 1 is also not interfered with any portions of the bracket 2.

Moreover, as shown in FIG. 4A, when the second damper 4 and the motor 1 are received within the opening portion 14, the pair of the slit portions 31 of the second damper 4 and the pair of the second guide protruding portions 20 of the large width portion 15 are positioned while the second damper 4 and the motor 1, and the bracket 2 are held so that the axis of the motor 1 and the longitudinal direction of the bracket 2 are substantially parallel with each other. With this, phases of the pair of the slit portions 31 of the second damper 4 and the pair of the second guide protruding portions 20 of the large width portion 15 are aligned with each other (correspond to each other). Moreover, the first damper 3 at the escape position P1 and the axis of the motor 1 including the second damper 4 are positioned to be substantially coaxial with each other.

This state where the axis of the first damper 3 and the axis of the motor 1 including the second damper 4 are positioned to be coaxial with each other when the motor 1 including the second damper 4 is received within the opening portion 14 is referred to as an initial assembly position P2. In this state, a lower half portion of the motor 1 shown in FIG. 1 is positioned to be lower than the bracket 2.

Besides, the second damper 4 includes the tapered portion 30a formed in the insertion hole 30. The second damper 4 is pressed and inserted onto the second protruding portion 6 of the motor 1 before the motor 1 is received within the opening portion 14. With this, it is possible to readily center the second damper 4 and the motor 1. At the same time, the key groove 32 of the second damper 4 and the key plate (not shown) of the second protruding portion 6 are engaged with each other. With this, it is possible to autonomously perform the phase adjustment and the rotation prevention between the motor 1 and the second damper 4 in the relative rotation direction between the motor 1 and the second damper 4.

In this way, the first damper 3 and the motor 1 including the second damper 4 are received on the bracket 2. Then, the motor 1 including the second damper 4 at the initial assembly position P2 of FIG. 4A is slid and moved toward the second guide protruding portions 20 to be brought to a state of FIG. 4B. That is, the motor 1 including the second damper 4 is slid and moved from the initial assembly position P2 of FIG. 4A in a rightward direction of FIG. 4A.

Figure 4B:
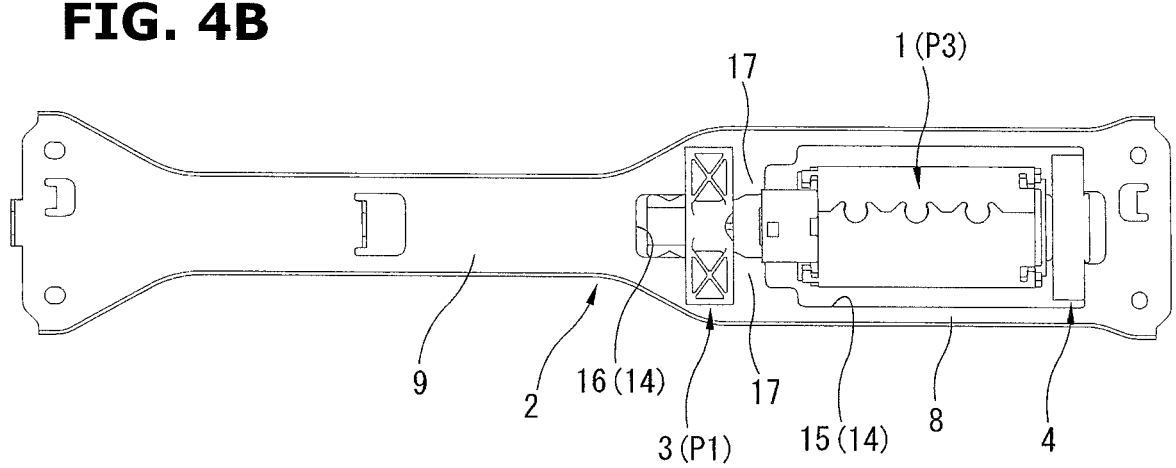

In this case, the pair of the slit portions 31 of the second damper 4 and the pair of the second guide protruding portions 20 of the large width portion 15 are already aligned with each other. Accordingly, the pair of the slit portions 31 are smoothly pressed and inserted onto the pair of the second guide protruding portions 20, as shown in FIG. 4B. Consequently, the motor 1 is positioned at a normal (regular) assembly position P3 with respect to the bracket 2. The motor 1 is supported on one side (right side in FIG. 4B) of the motor 1 through the second damper 4 with respect to the bracket 2 (a cantilever support of the motor 1 through the second damper 4 with respect to the bracket 2).

In this case, the only second damper 4 may be previously pressed and mounted onto the second guide protruding portions 20. Then, the motor 1 may be pressed toward the second damper 4.

Figure 4C:
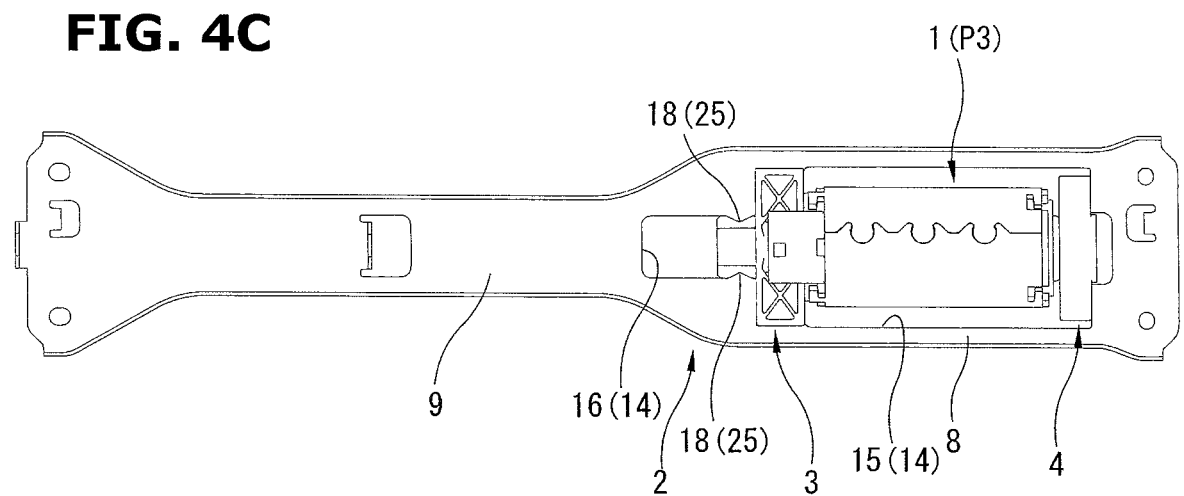

Next, the first damper 3 is slid and moved toward the motor 1 from the state of FIG. 4B, so that the first damper 3 is pressed and mounted onto the first protruding portion 5 of the motor 1 to be brought to the state of FIG. 4C. That is, the first damper 3 at the escape position P1 of FIG. 4B is slid and moved along the first guide protruding portions 17 in the rightward direction of the FIG. 4B so that the first damper 3 is pressed and mounted on the first protruding portion 5 of the motor 1. In this case, the first damper 3 at the escape position P1 is brought to the rotation prevention state by the first guide protruding portions 17 inserted into the pair of the slit portions 26. Accordingly, in this state, the phases of the first damper 3 and the first protruding portion 5 having the key plate 5a are aligned with each other.

Therefore, when the first damper 3 is pressed toward the motor 1 from the state of FIG. 4B, the first damper 3 is pressed and mounted onto the first protruding portion 5 while being centered by being guided by the tapered portion 23a of the insertion hole 23. The key groove 27 of the first damper 3 is engaged with the key plate 5a of the first protruding portion 5. With this, the motor 1 is supported by the cantilever support by the second damper 4, and the cantilever support by the first damper 3, at the normal assembly position P3 with respect to the bracket 2, as shown in FIG. 4C. Consequently, the motor 1 is supported on the both sides with respect to the bracket 2 through the first and second dampers 3 and 4.

In this case, as shown in FIG. 4C, the first damper 3 is slid and moved toward the motor 1 so that the first damper 3 is pressed to an appropriate position with respect to the motor 1. With this, the positioning protrusion portions 18 of the small width portion 16 of the opening portion 14, and the positioning recessed portions 25 of the first damper 3 are engaged with each other by the raised and recessed engagement. With this, the position of the first damper 3 is restricted to relatively position the first damper 3 and the bracket 2.

In this state, the motor 1 cannot be pulled out from the bracket 2 in a direction perpendicular to the axis of the motor 1, unless the first damper 3 is moved to the escape position P1. Accordingly, the motor 1 is stably supported on the both sides through the first and second dampers 3 and 4.

Besides, transmitting shafts (not shown) are inserted into the protruding portions 5 and 6 on the both end surfaces of the motor 1, so as to be connected to the rotation shaft of the motor 1 so as not to be rotated relative to the motor 1.

Another assembly process different from the above-described process of FIGS. 4A to 4C is explained with reference to FIGS. 4A to 4C.

In the state of FIG. 4A, the only second damper 4 mounted to the motor 1 at the initial assembly position P2 is slid and moved toward the second guide portions 20. In this case, the second damper 4 is pulled out from the second protruding portion 6 of the motor 1. At the same time, the second damper 4 is mounted on the second guide protruding portions 20. Sizes of the components are set to avoid the interference between the second protruding portion 6 of the motor 1 at the initial assembly position P2, and the second damper 4 mounted on the second guide protruding portion 20 in this state.

In this relationship, the first damper 3 is positioned at the escape position P1. The second damper 4 is previously mounted on the second guide protruding portions 20. Then, the motor 1 is positioned to the initial assembly position P2. Next, the first damper 3 is pressed and mounted onto the first protruding portion 5 of the motor 1 at the initial assembly position P2. Moreover, the first damper 3 and the motor 1 are slid and moved toward the second damper 4, so that the second protruding portion 6 of the motor 1 is inserted into the second damper 4. This position is the normal assembly position P3 of the motor 1. The motor 1 is supported on the both sides through the first and second dampers 3 and 4.

In this case, the motor 1 at the initial assembly position P2 may be firstly slid and moved toward the second damper 4 so that the second protruding portion 6 of the motor 1 is inserted into the second damper 4, so as to bring the motor 1 to the normal assembly position P3. Next, the first damper 3 at the escape position P1 is slid and moved toward the motor 1 so as to be mounted on the first protruding portion 5. With this, the motor 1 is supported by the cantilever support by the first damper 3, in addition to the cantilever support by the second damper 4. Consequently, the motor 1 is supported on the both sides through the first and second dampers 3 and 4.

In the embodiment according to the present invention, it is possible to assemble the first and second dampers 3 and 4 and the motor 1 to the bracket 2 only by the sliding movement along the surface of the bracket 2 including the opening portion 14 receiving the motor 1. Accordingly, the bracket 2 needs not to have a complicated three-dimensional shape. Therefore, it is possible to simplify the shape of the bracket 2, and to assemble the first and second dampers 3 and 4 and the motor 1 to the bracket 2 only by the linear sliding movement. Accordingly, it is possible to attain the good assembly operation. Consequently, it is possible to decrease the manufacturing cost. Moreover, it is possible to readily automate the motor assembly operation, for example, by an automation equipment such as an assembly robot, and to improve the productivity.

In the embodiment, the entire bracket 2 has a flat shape. However, the shape of the bracket 2 is not limited to this shape. For example, a stepped portion may be formed between the motor mounting portion 8 and the extension portion 9 of the bracket 2. Moreover, the first and second guide protruding portions 17 and 20 may be formed to have a height greater than that of the motor mounting portion 8. In these cases, the man-hour for processing the bracket 2 is substantially identical to that of the embodiment.

According to another aspect of the present invention, a motor mounting structure for an electric seat sliding device, the motor mounting structure includes: a motor including first and second protruding portions which is are provided on both ends of the motor in an axial direction; a first elastic support member arranged to be mounted on the first protruding portion of the motor; a second elastic support member arranged to be mounted on the second protruding portion of the motor; and a bracket arranged to support the both ends of the motor through the first elastic support member and the second elastic support member, the bracket including; an opening portion which has a length longer than an axial length of the motor, and which is arranged to receive the motor, first and second guide portions which are formed, respectively, on both end portions of the opening portion in a longitudinal direction, and which is arranged to be engaged, respectively, with the first and second elastic support members, the motor being arranged not to be unmounted from the bracket in a direction perpendicular to the axial direction of the motor, at a position at which the first and second elastic support members mounted on the first and second protruding portions of the motor are engaged with the first and second guide portions, at which and the motor is positioned at a normal assembly position with respect to the bracket, the first elastic support member being arranged to be moved between a position at which the first elastic support member is mounted on the first protruding portion, and an escape position at which the first elastic support member is unmounted from the first protruding portion, in a state where the first elastic support member is mounted on the first guide portion, the opening portion the first and second guide portions which have a shape arranged to receive the motor to which the second elastic support member is mounted on the second protruding portion, at an initial assembly position at which the motor is positioned coaxially with the first elastic support member positioned at the escape position, and the second elastic support member being arranged to be moved between a position at which the second elastic support member is engaged with the second guide portion, and a position where the second elastic support member is disengaged from the second guide portion, and where the second elastic support portion is mounted on the second protruding portion of the motor positioned at the initial assembly position.

According to still another aspect of the present invention, the motor to which the second elastic support member is mounted is arranged to be moved from the initial assembly position to the normal assembly position, so that the second elastic support member is engaged with the second guide portion.

According to still another aspect of the present invention, the second elastic support member is arranged to be moved toward the second guide portion from the motor to which the second elastic support member is mounted, and which is positioned at the initial assembly position, so that the second elastic support member is engaged with the second guide portion.

According to still another aspect of the present invention, the motor is arranged to be moved from the initial assembly position to the normal assembly position in a state where the first elastic support member is engaged with the first guide portion, so that the second elastic support member is engaged with the second guide portion.

According to still another aspect of the present invention, the motor mounting structure further comprises a holding section which is provided between the first guide portion and the first elastic support member mounted to the first protruding portion in a state where the motor is positioned at the normal assembly position, and which is arranged to restrict the position of the first elastic support member.

According to still another aspect of the present invention, the holding section includes a raised portion which is provided to one of the first guide portion and the first elastic support member, and a recessed portion which is provided to the other of the first guide portion and the first elastic support member, and which is arranged to be engaged with the raised portion of the holding section to restrict the position of the first elastic support member.

According to still another aspect of the present invention, the bracket has a flat shape; and the first and second guide portions are protruding portions each protruding from an edge portion of the opening portion.

Accordingly, in the present invention, in a case where the bracket is formed into, for example, a flat plate shape, it is possible to assemble the motor including the both elastic support members, to the bracket, only by the sliding movement along the surface of the bracket.

In the present invention, it is possible to assemble the motor including the both elastic support members, to the bracket, only by the sliding movement along the bracket including the opening portion. Accordingly, it is possible to simplify the shape of the bracket, and to improve the workability of the assembly operation. Consequently, it is possible to decrease the manufacturing cost, and to attain the automation of the assembly operation of the motor by using the automation equipment such as the assembly robot.

The entire contents of Japanese Patent Application No. 2018-51860 filed Mar. 20, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor mounting structure for an electric seat sliding device, the motor mounting structure comprising:
    a motor including a first protruding portion provided on a first end of the motor in an axial direction and a second protruding portion provided on a second end of the motor in the axial direction;
    a first elastic support member configured to be mounted on the first protruding portion of the motor;
    a second elastic support member configured to be mounted on the second protruding portion of the motor; and
    a bracket configured to support the first end of the motor through the first elastic support member and the second end of the motor through the second elastic support member, the bracket including
        an opening portion which has a length longer than an axial length of the motor, and which is configured to receive the motor,
        a first guide portion formed on a first end portion of the opening portion in a longitudinal direction and a second guide portion formed on a second end portion of the opening portion in the longitudinal direction, and wherein the first guide portion and the second guide portion are configured to be engaged, respectively, with the first elastic support member and the second elastic support member,
    wherein the motor is configured not to be unmounted from the bracket in a direction perpendicular to the axial direction of the motor, at a supported assembly position at which the first elastic support member is mounted on the first protruding portion of the motor and engaged with the first guide portion and the second elastic support member is mounted on the second protruding portion of the motor and engaged with the second guide portion, and at a normal assembly position at which the second guide portion is engaged with the second elastic support member,
    wherein the first elastic support member is configured to be movable between a mounted position at which the first elastic support member is mounted on the first protruding portion, and an escape position at which the first elastic support member is unmounted from the first protruding portion, in a state where the first elastic support member is mounted on the first guide portion,
    wherein the opening portion, the first guide portion, and the second guide portion are configured to receive the motor to which the second elastic support member is mounted on the second protruding portion in an initial assembly position at which the motor is positioned coaxially with the first elastic support member positioned in the escape position, and
    wherein the second elastic support member is configured to be movable between an engaged position at which the second elastic support member is engaged with the second guide portion, and a disengaged position where the second elastic support member is disengaged from the second guide portion and where the second elastic support portion is mounted on the second protruding portion of the motor positioned at the initial assembly position.

2. The motor mounting structure as claimed in claim 1, wherein the motor to which the second elastic support member is mounted is configured to be movable from the initial assembly position to the normal assembly position, so that the second elastic support member is engaged with the second guide portion.

3. The motor mounting structure as claimed in claim 1, wherein the second elastic support member is configured to be movable toward the second guide portion from the motor to which the second elastic support member is mounted, and which is positioned at the initial assembly position, such that the second elastic support member is engaged with the second guide portion.

4. The motor mounting structure as claimed in claim 1, wherein the motor is configured to be movable from the initial assembly position to the normal assembly position in a state where the first elastic support member is engaged with the first guide portion, such that the second elastic support member is engaged with the second guide portion.

5. The motor mounting structure as claimed in claim 2, wherein the motor mounting structure further comprises a holding section which is provided between the first guide portion and the first elastic support member mounted to the first protruding portion in a state where the motor is positioned at the normal assembly position, and which is arranged to restrict the position of the first elastic support member.

6. The motor mounting structure as claimed in claim 5, wherein the holding section includes a raised portion which is provided to one of the first guide portion and the first elastic support member, and a recessed portion which is provided to the other of the first guide portion and the first elastic support member, and which is arranged to be engaged with the raised portion of the holding section to restrict the position of the first elastic support member.

7. The motor mounting structure as claimed in claim 1, wherein the bracket has a flat shape; and the first guide portion and the second guide portion each protrude from an edge portion of the opening portion.

* * * * *